May 10, 1932.  E. A. PHILLIPS  1,857,972
MANUFACTURE OF HOLLOW ARTICLES OF RUBBER
Filed Sept. 18, 1931
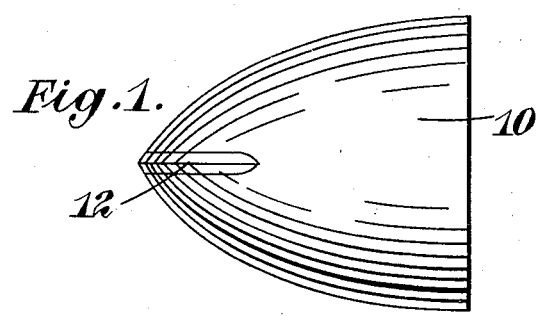
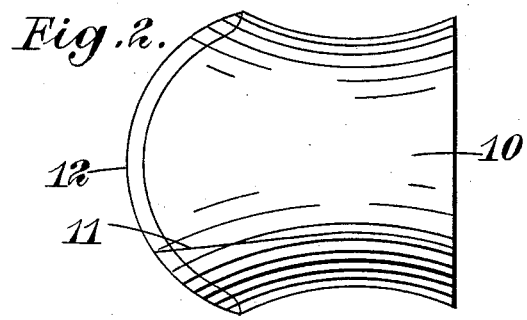
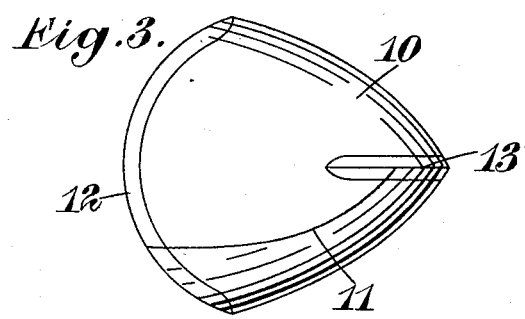
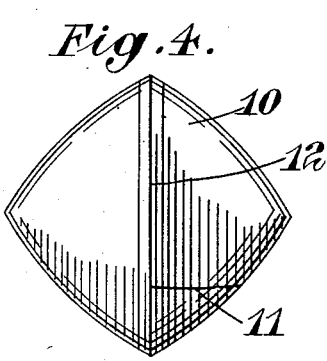
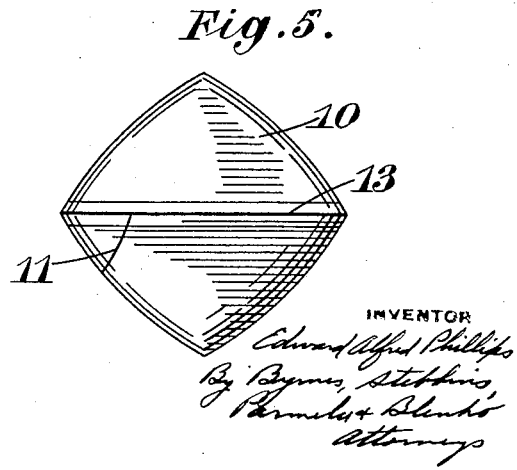
INVENTOR
Edward Alfred Phillips
By Byrnes, Stebbins,
Parmelee & Blenko
Attorneys Patented May 10, 1932

1,857,972

UNITED STATES PATENT OFFICE

EDWARD ALFRED PHILLIPS, OF LONDON, ENGLAND, ASSIGNOR TO THE INDIA RUBBER, GUTTA PERCHA AND TELEGRAPH COMPANY LIMITED, OF LONDON, ENGLAND, A BRITISH COMPANY

MANUFACTURE OF HOLLOW ARTICLES OF RUBBER

Application filed September 18, 1931, Serial No. 563,485, and in Great Britain October 10, 1930.

This invention consists of improvements in or relating to the manufacture of hollow articles of rubber and in particular comprises an improved method of making hollow blanks which are afterwards to be moulded and vulcanized to form hollow articles of rubber, for example, hollow rubber balls.

According to the present invention a method of making rubber blanks for use in the manufacture of hollow rubber articles comprises the step of closing the two open ends of an open ended tubular blank of unvulcanized rubber. The line of closure of at least one end of the tube may intersect the axis of the latter, for example, it may intersect the axis at right angles either in a straight line of closure or in an arc having a chord at right angles to the tubular axis.

The line of closure of one end may extend in a direction (or lies in a plane) transverse to the line of closure of the other end. The planes which are parallel to the axis of the blank and contain the respective lines of closure of the two ends may be at right angles to one another.

One form of the invention comprises a method of making rubber blanks for use in the manufacture of hollow rubber balls wherein the respective lines of closure of the two ends of the tubular blank both intersect the axis of the blank and lie in planes radial to the axis and at right angles to one another. The lines of closure may be curved (e. g. on an arc) with a concave side towards the centre of the blank.

Preferably after or simultaneously with the closing in of the ends of the tubular blank the contiguous edges at each end of the blank are pressed firmly together to form a sealed or "welded" joint at each end of the blank.

Preferably also simultaneously with the closing in of the ends of the blank, portions of the contiguous edges are bitten away in such manner as to leave the said edges with the desired contour, according to the shape of the article to be formed. Conveniently simultaneously with the biting away of the said edges the portions of the contiguous edges inwards (relatively to the blank) from the portions bitten away are pressed together to form a sealed or "welded" joint.

Where the hollow blank is for use in the manufacture of a hollow spherical rubber article (e. g. a hollow rubber ball) the portions of the contiguous edges are bitten away in such manner as to leave each of said edges closed and sealed upon an arc, the concave side of which is towards the centre of the blank.

The tubular blank may be made in any desired manner. For example it may comprise a length cut from an extruded rubber tube or from a rubber tube formed by wrapping sheet rubber around a mandrel. Alternatively each tubular blank may be individually formed by folding a rectangular sheet of vulcanized rubber into tubular form, the contiguous edges being lapped and then pressed to form a "welded" joint of equal thickness with that of the sheet from which the blank is made.

In order that the invention may be more readily understood reference will now be made to the accompanying drawings in which:—

Figure 1 shows a rubber blank having one end closed in accordance with the invention;

Figure 2 is a view looking down on Figure 1;

Figure 3 is a view similar to Figure 2 of the blank after both ends have been closed;

Figure 4 is a view from the left of Figure 3 and

Figure 5 is a view from the right of Figure 3.

In making a hollow blank for use in the manufacture of a rubber ball a tubular blank is formed from a rectangular sheet of rubber 10 by pressing two of its opposed edges together along a joint shown at 11. Thereafter one end 12 of the blank is closed in and the joint given the required arcuate contour and sealed by being inserted between the opposed jaws of a cutting and sealing press. For this purpose a cutting and pressing machine similar to that described in prior British specification No. 229,004 may be employed. Each jaw has a cutting or biting edge of arcuate contour which is bevelled towards its concave side (that is to say towards the blank when it is presented to the jaws) so that when the jaws of the press come together, the edges of the blank are firmly pressed together and the superfluous rubber beyond the jaws is spewed out and cut off. One jaw of the press is preferably fixed and the other movable there-toward by means of a foot treadle. One end 12 of the cylindrical blank is first so presented to the jaws and cut and sealed so that the resulting joint intersects the axis of the blank in such manner that the length of the joint lying on each side of the said axis is equal. The other end 13 of the blank is then presented to the jaws of the press and cut and sealed in such manner that the resulting joint is similar to the joint at the first end, but lies in a plane which is at right angles to the plane in which the joint at the first end lies as shown in Figures 4 and 5.

After the operation on the first end, but before the operation on the second end, an inflating medium is placed within the blank which is effective, when the blank is placed in a mould in a vulcanizing chamber, to expand the blank to the mould. Such inflating media are well known.

If it is desired further to inflate the ball after moulding and vulcanizing by means of a hollow needle the usual square block of unvulcanizable rubber may be attached to the rectangular sheet of rubber in such position that it will be suitably positioned on the inner wall of the blank after the closing in of its ends. The location of this block may be marked on the other side of the sheet in the usual way.

I claim:—

1. A method of making rubber blanks for use in the manufacture of rubber articles which comprises the step of closing the two open ends of an open ended tubular blank of unvulcanized rubber in such a manner that the line of closure of one end extends in a direction transverse to the line of closure of the other end.

2. A method of making rubber blanks for use in the manufacture of rubber articles which comprises the step of closing the two open ends of an open ended tubular blank of unvulcanized rubber in such a manner that the line of closure of one end lies in a plane transverse to the line of closure of the other end.

3. A method of making rubber blanks for use in the manufacture of rubber articles which comprises the step of closing the two open ends of an open ended tubular blank of unvulcanized rubber in such a manner that the line of closure of one end extends in a direction transverse to the line of closure of the other end and intersects the axis of the blank.

4. A method of making rubber blanks for use in the manufacture of rubber articles which comprises the step of closing the two open ends of an open ended tubular blank of unvulcanized rubber in such a manner that the line of closure of one end extends in a direction transverse to the line of closure of the other end and intersects the axis of the blank at right angles in a straight line of closure to the axis of the tube.

5. A method of making rubber blanks for use in the manufacture of rubber articles which comprises the step of closing the two open ends of an open ended tubular blank of unvulcanized rubber in such a manner that the line of closure of one end extends in a direction transverse to the line of closure of the other end and intersects the axis of the blank at right angles in an arc having a chord at right angles to the axis of the tube.

6. A method of making rubber blanks for use in the manufacture of rubber articles which comprises the step of closing the two open ends of an open ended tubular blank of unvulcanized rubber in such a manner that the line of closure of one end extends in a direction transverse to the line of closure of the other end and so that the planes which are parallel to the axis of the blank and which contain the respective lines of closure of the two ends are at right angles to one another.

7. A method of making rubber blanks for use in the manufacture of rubber articles which comprises the step of closing the two open ends of an open ended tubular blank of unvulcanized rubber in such a manner that the line of closure of one end lies in a plane transverse to the line of closure of the other end and so that the planes which are parallel to the axis of the blank and which contain the respective lines of closure of the two ends are at right angles to one another.

8. A method of making rubber blanks for use in the manufacture of rubber articles which comprises the step of closing the two open ends of an open ended tubular blank of unvulcanized rubber in such a manner that the line of closure of one end extends in a direction transverse to the line of closure of the other end and so that the respective lines of closure of the two ends of the tubular blank both intersect the axis of the blank and lie in planes radial to the axis and at right angles to one another.

9. A method of making rubber blanks for use in the manufacture of rubber articles which comprises the step of closing the two open ends of an open ended tubular blank of unvulcanized rubber in such a manner that the line of closure of one end lies in a plane transverse to the line of closure of the other end and so that the respective lines of closure of the two ends of the tubular blank both intersect the axis of the blank and lie in planes radial to the axis and at right angles to one another.

10. A method of making rubber blanks for use in the manufacture of rubber articles which comprises the step of closing the two open ends of an open ended tubular blank of unvulcanized rubber in such a manner that the line of closure of one end extends in a direction transverse to the line of closure of the other end, and so that the respective lines of closure of the two ends of the tubular blank both intersect the axis of the blank and lie in planes radial to the axis and at right angles to one another wherein the lines of closure are curved with the concave side towards the centre of the blank.

11. A method of making rubber blanks for use in the manufacture of rubber articles which comprises the step of closing the two open ends of an open ended tubular blank of unvulcanized rubber in such a manner that the line of closure of one end extends in a direction transverse to the line of closure of the other end and so that the respective lines of closure of the two ends of the tubular blank both intersect the axis of the blank and lie in planes radial to the axis and at right angles to one another wherein the lines of closure are arcuate with the concave side towards the centre of the blank.

12. A method of making rubber blanks for use in the manufacture of rubber articles which comprises the steps of closing the two open ends of an open ended tubular blank of unvulcanized rubber in such a manner that the line of closure of one end extends in a direction transverse to the line of closure of the other end and pressing the contiguous edges firmly together to form a sealed joint.

13. A method of making rubber blanks for use in the manufacture of rubber articles which comprises the steps of closing the two open ends of an open ended tubular blank of unvulcanized rubber in such a manner that the line of closure of one end lies in a plane transverse to the line of closure of the other end and pressing the contiguous edges firmly together to form a sealed joint.

14. A method of making rubber blanks for use in the manufacture of rubber articles which comprises the steps of closing the two open ends of an open ended tubular blank of unvulcanized rubber in such a manner that the line of closure of one end extends in a direction transverse to the line of closure of the other end, pressing the contiguous edges firmly together to form a sealed joint and biting away these contiguous edges in such a manner as to leave the said edges with the desired contour.

15. A method of making rubber blanks for use in the manufacture of rubber articles which comprises the steps of closing the two open ends of an open ended tubular blank of unvulcanized rubber in such a manner that the line of closure of one end lies in a plane transverse to the line of closure of the other end, pressing the contiguous edges firmly together to form a sealed joint and biting away these contiguous edges in such a manner as to leave the said edges with the desired contour.

16. A method of making rubber blanks for use in the manufacture of hollow rubber articles which comprises the step of closing the two open ends of an open ended blank of unvulcanized rubber formed from extruded rubber tube so that the line of closure of one end extends in a direction transverse to the line of closure of the other end.

17. A method of making rubber blanks for use in the manufacture of hollow rubber articles which comprises the step of closing the two open ends of an open ended tubular blank cut from a tube formed by wrapping unvulcanized sheet rubber round a mandrel so that the line of closure of one end extends in a direction transverse to the line of closure of the other end.

18. A method of making rubber blanks for use in the manufacture of hollow rubber articles which comprises the steps of closing two open ends of an open ended blank formed from a rectangular sheet of rubber into tubular form by lapping opposite edges of the said sheet together and pressing said edges together to form a sealed joint in such a manner that the line of closure of one end extends in a direction transverse to the line of closure of the other end.

19. A method of making rubber blanks for use in the manufacture of rubber articles which comprises the steps of closing the two open ends of an open ended tubular blank of unvulcanized rubber in such a manner that the line of closure of one end extends in a direction transverse to the line of closure of the other end and biting away the material adjacent the lines of closure by means of jaws of arcuate contour bevelled towards their concave side.

20. A hollow rubber blank for use in the manufacture of hollow rubber articles formed by closing both ends of a tubular blank of unvulcanized rubber in such a manner that the line of closure of one end extends in a direction transverse to the line of closure of the other end.

21. A hollow rubber article made from a tubular blank of unvulcanized rubber the ends of which have been closed in such a manner that the line of closure of one end extends in a direction transverse to the line of closure of the other end.

In testimony whereof I affix my signature.

EDWARD ALFRED PHILLIPS.

CERTIFICATE OF CORRECTION.

Patent No. 1,857,972.  May 10, 1932.

EDWARD ALFRED PHILLIPS.

It is hereby certified that the name of the assignee in the above numbered patent was erroneously described and specified as "The India Rubber, Gutta Percha and Telegraph Company Limited", whereas said name should have been described and specified as The India Rubber, Gutta Percha and Telegraph Works Company Limited, as shown by the records of assignments in this office; and that the said Letters Patent should be read with this correction therein that the same may conform to the record of the case in the Patent Office.

Signed and sealed this 12th day of July, A. D. 1932.

(Seal)

M. J. Moore,
Acting Commissioner of Patents.